(12) United States Patent
Ehirim

(10) Patent No.: US 9,957,000 B1
(45) Date of Patent: May 1, 2018

(54) DOWNFORCE-ENHANCEMENT OF AN AUTOMOBILE-TYPE DIFFUSER USING TWO DEVICES

(71) Applicant: Obinna Hyacinth Ehirim, Port Harcourt (NG)

(72) Inventor: Obinna Hyacinth Ehirim, Port Harcourt (NG)

(73) Assignee: Obinna Hyacinth Ehirim, Shrivenham (GB)

( * ) Notice: Subject to any disclaimer, the term of this patent is extended or adjusted under 35 U.S.C. 154(b) by 0 days. days.

(21) Appl. No.: 15/442,649

(22) Filed: Feb. 25, 2017

(51) Int. Cl.
*B62D 35/02* (2006.01)

(52) U.S. Cl.
CPC .................................... *B62D 35/02* (2013.01)

(58) Field of Classification Search
CPC ................................ B62D 35/02; B62D 35/00
USPC ....................................................... 296/180.1
See application file for complete search history.

(56) References Cited

U.S. PATENT DOCUMENTS

| 4,455,045 A * | 6/1984 | Wheeler | B62D 35/00 105/1.2 |
| 4,830,315 A * | 5/1989 | Presz, Jr. | B64C 21/10 114/102.29 |
| 8,210,600 B1 * | 7/2012 | Verhee | B62D 35/005 296/180.1 |
| 8,366,178 B2 * | 2/2013 | Yamagishi | B62D 35/02 180/903 |

* cited by examiner

*Primary Examiner* — Pinel E Romain

(57) ABSTRACT

An automobile diffuser is the upwardly-ramped surface at the rear of the vehicle's underbody. Aerodynamic downforce and drag are generated as airflow travels underneath and along the ramped surface of the diffuser. However, with a moderate drag penalty, the downforce-producing effect of the diffuser can be further enhanced by an arrangement of aerodynamic devices along the ramp surface and within the diverging flow channel of the vehicle's diffuser.

8 Claims, 3 Drawing Sheets

DOWNFORCE-ENHANCEMENT OF AN AUTOMOBILE-TYPE DIFFUSER USING TWO DEVICES

CONTEXT OF THE INVENTION

1. Scope of Invention

The invention relates to downforce-enhancing devices for the diffuser of an automobile.

2. Description of the Related Art

The invention concerns the diffuser of an automobile which includes road, sports and open-wheel racing cars. It is the aim of this invention to improve the driving performance of an automobile by providing a utility concept configuration of two aerodynamic devices that enhance the aerodynamic performance of the diffuser with respect to downforce and aerodynamic drag.

3. Description of the Automobile Diffuser

The diffuser is an aerodynamic element of an automobile which influences the driving performance of the vehicle. At the rear of the automobile's underbody, the diffuser comprises of an elevating ramp surface with lengthwise endplates extending from the start to the end of the elevation. Additional side plates or strakes can be added within the diffuser's diverging area to divide the flow area into multiple flow channels which enable the longitudinal straightening of the airflow travelling through the diffuser.

As the vehicle travels along the road, airflow likewise travels towards the vehicle at the same travelling speed of vehicle. The airflow that travels underneath the vehicle, along its underbody surface exits into the atmosphere by flowing through the underbody diffuser. As the airflow travels through the diffuser channel(s) the resultant aerodynamic effect generated acts on the performance of the car.

This aerodynamic phenomenon is as a result of the suction created by the diffuser. As the underbody airflow travels underneath the car, the start of the elevating ramp surface of the diffuser further accelerates and also lowers the pressure of the airflow travelling through the diverging area of the diffuser. The diverging expansion of the diffuser area then acts as a region where the airflow expands, thereby reducing its speed and increasing its pressure before it exits the diffuser into the surrounding atmosphere. Through this interaction between the vehicle's diffuser and its underbody airflow, the suction effect (low pressure) created by the diffuser translates into downforce acting on the vehicle. The downforce pushes the vehicle and thus its tyres into the surface of the road which in-turn enhances the traction of the surface of the tires in contact with the road surface.

In racing cars, the displacement (ride height) between its underbody diffuser and the race track surface is low enough to enable the effectiveness of the diffuser. The downforce generated by the diffuser enables the reduction in lap times on the race track. This is due to the enhanced race track surface grip of the racing car's tires which allows the racing car driver to drive faster on the corners of the race track without skidding. However in road cars, where the ride height of the diffuser is too high for the diffuser to effectively create substantial downforce, a combination of a smooth underbody and a diffuser section leads to a reduction in underbody aerodynamic drag. This in-turn leads to improved fuel economy—a reduction in the amount of fuel expended by the vehicle's engine to overcome the aerodynamic drag which acts to pull the car in the opposite direction.

INVENTION SUMMARY

The invention disclosed is a setup of two aerodynamic devices within the diffuser, aimed at improving its overall aerodynamic impact on the driving performance of an automobile. This utility concept consists of a convex-shaped bump and an inverted low-speed/high-lift/flat-bottomed airfoil-shaped wing. The convex-shaped bump forms part of the ramped surface of the diffuser and spans the entire width of the diffuser ramp—at a location close to the exit of the diffuser. The wing is also positioned at a similar location close to the exit of the diffuser; however, it is suspended across the span of the diffuser at the same angle as the diffuser ramp. The wing is attached to endplates at both sides of the diffuser and/or by additional side plates (strakes) within the diverging flow area of the diffuser.

The convex-shaped bump is about 5 mm to 6 mm thick along its spanwise centerline (which is also its thickest point) and the distance between the top surface of the suspended inverted wing and the convex-shaped bump thickest point is about 9 mm to 15 mm. The specified gap between the convex bump surface and the top surface of the inverted wing is within the approximate boundary layer thickness of the diffuser ramp surface. In addition, the length of the convex-shaped bump on the diffuser ramp is about 5 mm to 7 mm longer than the chord length of the wing. The length of the convex-shaped bump and the chord length of the wing are configured to be within 15% to 25% of the entire length of the diffuser ramp (from the start of the diffuser to its exit).

The diffuser generates downforce through the pressure recovery from the fast-moving and low pressure airflow at the start of its ramp to the slower-moving and higher pressure airflow at the exit of the diffuser. Thus, the premise that governs the downforce enhancement created by the invention disclosed is that a favourable alteration of the pressure recovery of the diffuser with the use of passive flow control enhances the downforce produced by the diffuser. Therefore, lowering or maintaining the low pressure of the airflow through the diffuser by increasing its speed before the airflow recovers to a higher pressure at the diffuser exit, also lowers the average pressures within the diffuser. This means that ultimately, the downforce generated by the diffuser will be increased.

Hence, when the fast-moving airflow entering the diffuser is further accelerated by the surface curvature which in turn generates a pressure gradient at the start (inlet) of the diffuser, it creates the most suction or lowest pressures of the diffuser at that location. This airflow then begins to decelerate as it expands through the diverging area of the diffuser. Subsequently, the flow curvature effect of the convex bump surface downstream of the diffuser inlet causes an increase in velocity of the decelerating higher pressure airflow as it proceeds towards the diffuser exit. As a result, the pressure of the airflow is lowered as it passes through the distance between the top surface (pressure surface) of the inverted wing and the surface of the convex-shaped bump, before exiting into the atmosphere at a higher pressure. However, a substantial suction increment (which implies additional downforce) is created by the radial pressure gradient induced by the curvature of the bottom surface of the inverted wing. The bottom surface (suction surface) of the inverted wing further accelerates the flow travelling underneath it as a result of the effects of flow curvature. This occurrence likewise, causes the pressure levels of the airflow close to the exit of the diffuser to drop before it exits into the surrounding environment at a higher pressure. Ultimately, this invention as delineated allows the diffuser to produce more downforce with a modest increase in aerodynamic drag created by the convex-shaped bump and inverted wing.

DETAILED EXPLANATION OF COMPONENTS OF THE INVENTION

Figure 1:
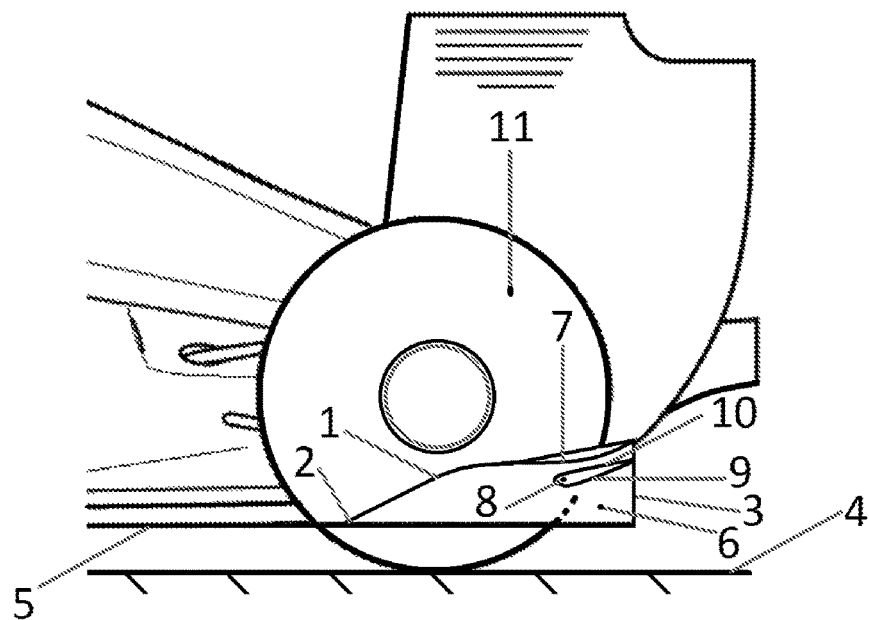
FIG. 1 is a side view schematic of the rear of road vehicle with the underbody including the diffuser ramp 1 with the inverted downforce-enhancing wing 8 (of FIG. 3) and the convex-shaped bump 7.
Figure 2:
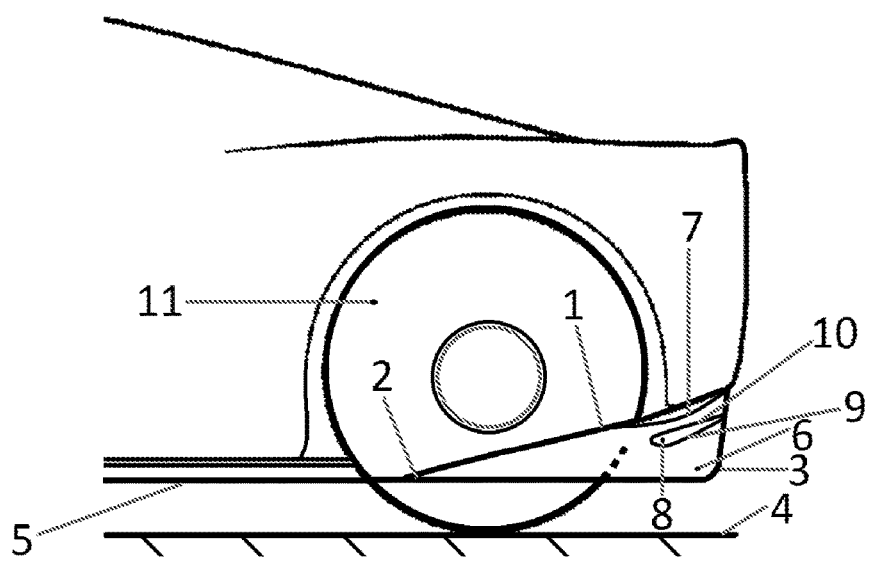
FIG. 2 is a side view schematic of the rear of an open wheel racing vehicle with the underbody including the diffuser ramp 1 with the inverted downforce-enhancing wing 8 (of FIG. 3) and the convex-shaped bump 7.

The upward-sweeping diffuser ramp 1 together with the flat underbody section 5 forms a significant portion of the underbody surface of a road vehicle or a race car. The diffuser which is located at the aft section of the vehicle's underbody also includes the endplates 6 at both lengthwise ends of the diffuser ramp surface. The length of the diffuser can be designed to extend beyond the length of the rear wheels 11 of the automobile or at a percentage of the rear wheel length.

The diffuser produces a negative lift effect (downforce) when the underbody airflow travelling along the surface of the flat section of the vehicle's underbody enters the diffuser through its inlet 2. Subsequently, the airflow gradually diffuses across the diffuser length before reintroduced to the atmosphere through the diffuser exit 3. This diffuser flow behaviour transpires as the vehicle travels along the road surface 4. The displacement or ride height between the road surface and the underbody diffuser keeps the fast-moving and low pressure airflow entering the diffuser constrained. Also, the endplates keep the diffusing airflow within the diffuser from interacting with the high pressure freestream outside the diffuser or the disturbance of the turbulent wake from the vehicle's rear wheels.

Figure 3:
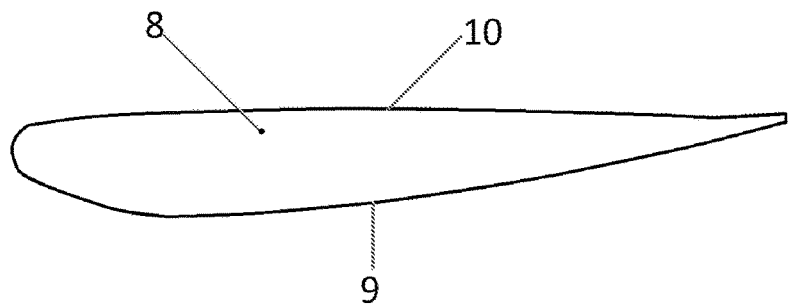
FIG. 3 is an outline of the side view of an inverted flat-bottomed and high-lift airfoil 8 of a wing with its suction surface 9 and pressure surface 10 used in aerodynamic applications operating in low speed (subsonic).
Figure 4:
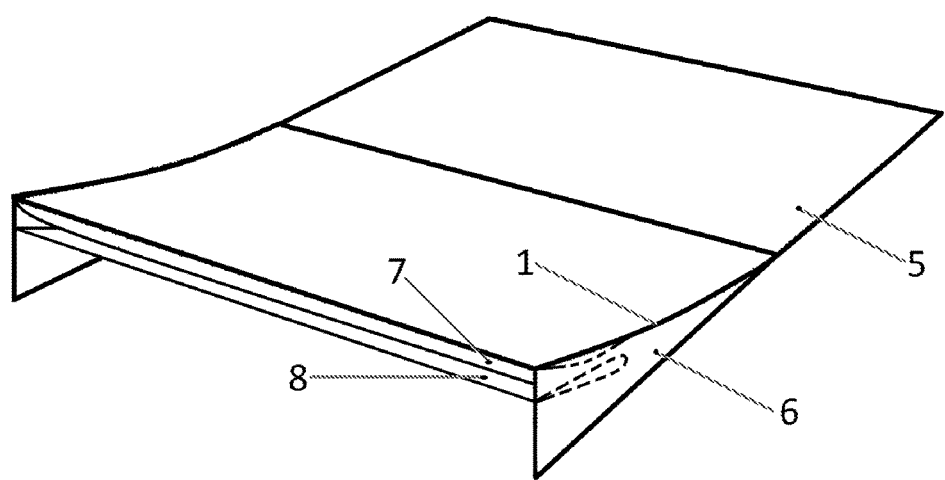
FIG. 4 is an isometric view of the underbody of a vehicle including the flat section 5, diffuser ramp 1 and the convex-shaped bump 7 on the diffuser ramp and inverted wing 8.
Figure 5:
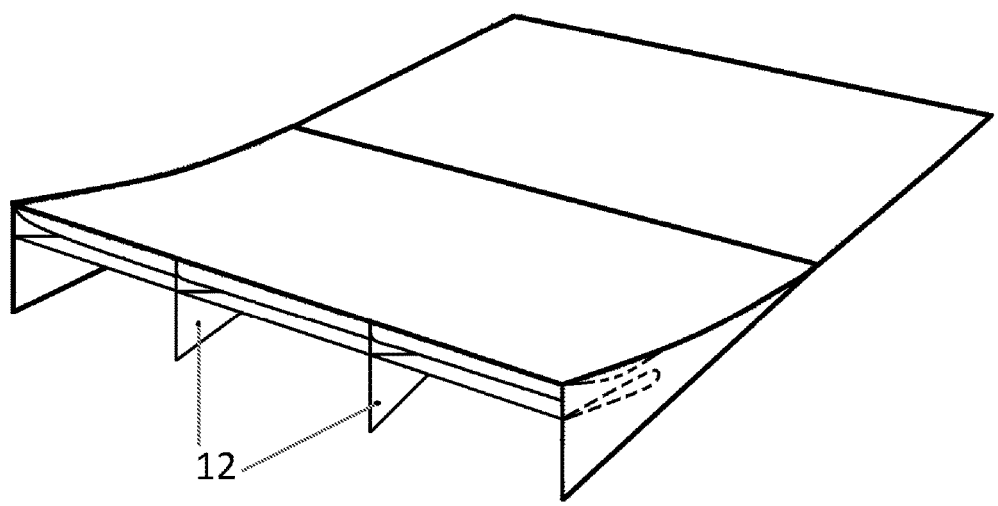
FIG. 5 is an isometric view of the underbody of a vehicle including the flat section 5, diffuser ramp 1 with inner side walls or strakes 12 and the convex-shaped bump 7 on the diffuser ramp and inverted wing 8.

As a means of enhancing the downforce produced by the diffuser, a convex-shaped bump 7 with 6 mm in thickness is attached to the surface of the diffuser ramp. The convex-shaped bump is positioned across the diffuser length and close to the diffuser exit. In addition, an inverted wing 8 (with airfoil shape illustrated in FIG. 3) is positioned across the span of the diffuser underneath the convex-shaped bump and at an angle equal to the diffuser ramp angle. The length of the convex-shaped bump and inverted wing is within the range of 15% to 25% of the diffuser length with the convex-shaped bump 5 mm to 7 mm longer than the chord length of the wing. The gap between the convex-shaped bump surface and the pressure surface (top surface) of the wing is about 9 mm to 15 mm. The gap specification is within 30% to 60% of the approximate boundary layer thickness of the diffuser ramp. For diffusers with internal side walls or strakes 12, the convex-shaped bump and wing extends between the lengths of the subdivided flow channels (FIG. 5).

What is claimed:

1. A vehicle underbody diffuser to enhance aerodynamic downforce; consisting of a single flow channel or a subdivided flow channel located at a rear of an automobile, the said diffuser including:
    A convex-shaped bump attached on a diffuser ramp surface across a span of the diffuser flow channel and at a location close to an exit of the diffuser flow channel.
    An inverted wing with a pressure surface as atop surface and a suction surface as the bottom surface positioned laterally across a span of the diffuser flow channel and underneath the convex-shaped bump with a chord length of the wing parallel to the length of the bump.

2. The vehicle underbody diffuser to enhance aerodynamic downforce as defined in claim 1, wherein a maximum thickness of the convex-shaped bump is about 5 mm to 6 mm so as to enhance airflow velocity along the surface of the bump while maintaining a low aerodynamic drag.

3. The vehicle underbody diffuser to enhance aerodynamic downforce as defined in claim 1, wherein the length of the convex surface convex-shaped bump is about 15% to 25% of the diffuser length.

4. The vehicle underbody diffuser to enhance aerodynamic downforce as defined in claim 1, wherein a maximum thickness of the inverted wing is about 10 mm to 15 mm.

5. The vehicle underbody diffuser to enhance aerodynamic downforce as in claim 1, wherein an angle of attack of the inverted wing is equal to the diffuser ramp surface angle so as to prevent an occurrence of airflow separation from the wing pressure surface.

6. The vehicle underbody diffuser to enhance aerodynamic downforce as defined in claim 1, wherein the inverted wing chord length is about 15% to 25% of the diffuser length.

7. The vehicle underbody diffuser to enhance aerodynamic downforce as defined in claim 1, wherein a gap between the convex-shaped bump surface and the pressure surface of the inverted wing is about 9 mm to 15 mm.

8. The vehicle underbody diffuser to enhance aerodynamic downforce as defined in of claim 1, wherein the length of the convex-shaped bump surface is about 5 mm to 7 mm longer than the chord length of the inverted wing.

\* \* \* \* \*